UNITED STATES PATENT OFFICE.

THEODORE WEBER, OF ALTON, ILLINOIS, ASSIGNOR TO J. G. SARGENT.

IMPROVED INDIGO DYE.

Specification forming part of Letters Patent No. 86,047, dated January 19, 1869.

*To all whom it may concern:*

Be it known that I, THEODORE WEBER, of Alton, in the county of Madison and State of Illinois, have invented a new and Improved Dyeing Compound; and I do hereby declare that the following is a full, clear, and exact description thereof, which will enable those skilled in the art to make and use the same.

To prepare the common indigo of commerce for dyeing purposes, it has heretofore been the practice to ferment it in a vat or vessel containing wheat-bran, soda-ash, and madder, the fermentation being induced by woad, molasses, or other matter. This fermenting process separated the extraneous matter contained in commercial indigo from the pure coloring principle, which only is available in dyeing fabrics.

In the above process the fermentation must be arrested at a certain stage, and to accomplish this air-slaked lime is added in successive quantities to retard and finally arrest fermentation. Should, however, the lime be added too soon or too late, the desired effect will be lost. No reliable rule can be laid down for the guidance of the attendant in this respect. He must rely solely upon his judgment and experience, which are, with able and skilled attendants, frequently at fault. The preparation thus obtained is only adapted to the dipping (dyeing) of wool, whereas the preparation obtained by my process is available for any and all of the commonly-known fabrics, as wool, cotton, silk, linen, and the like.

My process also avoids the liability of failure by the untimely addition of the lime.

The process by which this compound or preparation is obtained may be described as consisting of several steps or stages, and which in practice I usually pursue in the order herein laid down, though it may be observed that for some one of the steps or stages, as herein set forth, another one may be substituted, and the product resulting from such substitution may be identical with or sufficiently analogous to the product obtained by the original steps, as set forth, and I desire to be understood as not limiting myself to the particular order or proportions herein described, or the precise steps or stages in every instance, as all these may be reasonably departed from without materially affecting the result.

I. I first take one pound of crytals of tin, (the protochloride of tin,) and dissolve the same in one gallon of water, in which solution one pound of soda-ash (crude carbonate of soda) is also dissolved. The result is a precipitate of the hydrated protoxide of tin. The soda-ash must be added slowly, as the oxide of tin will dissolve in excess of the soda-ash. The precipitate is allowed to settle, usually from two to four hours, when the watery menstruum is poured off and pure water added, and carefully poured off several times, until the precipitate is thoroughly washed from any adherent acid, which may be ascertained by tasting the water, or by litmus-paper. The last water is poured from the precipitate and should have only a slight bitter taste.

II. I now take ten pounds of good fresh quicklime, and dissolve it in seven and a half gallons of boiling water in a separate vessel.

III. I now dissolve twelve pounds of soda-ash in about seven and a half gallons of boiling water in another vessel.

IV. I now combine the quicklime solution and the soda-ash solution obtained at the third and fourth steps of the process, and the result is a caustic-lye liquor, which liquor is allowed to stand after being well stirred. When settled the clear caustic lye is drawn off or decanted.

V. I now add one pound of pulverized indigo (common commercial indigo) to six quarts of the caustic lye obtained at IV, and when well mixed I add thereto the precipitate (hydrated oxide of tin) which was obtained at the first step of the process.

This compound is well stirred and brought slowly to a boil until all the indigo is dissolved, and kept warm for two hours, being stirred occasionally. The compound is then cooled slowly, and when cool is ready for use as a preparation or compound for dyeing, in which the indigo is perfectly reduced and capable of seizing on and affixing itself in any textile fabric immersed therein.

It will be obvious from the foregoing that the process consists substantially in dissolving the hydrated oxide of tin and common indigo in caustic lye, and thus obtaining a dyeing fluid or compound which is more desirable and generally applicable than other compounds for the same purpose heretofore employed.

The process above set forth in several steps or stages is perhaps the most economical for producing the aforesaid compound, and as such I desire to claim it *per se*.

I claim as new and desire to secure by Letters Patent—

1. A dyeing compound obtained by dissolving in caustic lye the hydrated oxide of tin and common indigo, substantially as and for the purpose herein described.

2. The general process for obtaining the above compound, substantially as herein described.

THEODORE WEBER.

Witnesses:
 THOS. MIDDLETON,
 W. H. MASON.